United States Patent Office 3,558,739
Patented Jan. 26, 1971

3,558,739
ACCELERATOR SYSTEMS COMPRISING 2-(AMINO-POLYTHIO)-THIAZOLE AND THIURAMS
Herbert N. Kagarise, Mogadore, Ohio, assignor to The Goodyear Tire & Rubber Company, Akron, Ohio, a corporation of Ohio
No Drawing. Filed Aug. 29, 1968, Ser. No. 756,297
Int. Cl. C08f 27/06
U.S. Cl. 260—79.5                                    10 Claims

ABSTRACT OF THE DISCLOSURE

Sulfur vulcanization systems and accelerator systems containing specific 2-(aminodithio) - thiazoles and 2-(aminotrithio)-thiazoles, such as 2 - (morpholinodithio)-benzothiazole and 2-(morpholinotrithio) - benzothiazole and specific thiuram compounds, such as tetramethylthiuram disulfide; polymers containing said systems; and a method for vulcanizing polymers by heating the unvulcanized polymer in the presence of said systems.

This invention relates to accelerator and vulcanization systems for polymers, to polymers containing said systems, to polymers vulcanized with said systems and to a method for vulcanizing polymers.

In order for most polymers to possess satisfactory physical properties it is necessary that they be in a vulcanized state. Normally vulcanization systems for conventional rubbers such as butadiene/styrene elastomers, natural rubber, cis-1,4-polyisoprene and cis-1,4-polybutadiene are comprised of a vulcanization agent and an accelerator system, the vulcanization agent normally being sulfur or a sulfur donating compound. The accelerator system is normally comprised of one or more compounds which accelerate the rate of vulcanization. Various 2-(aminodithio)-thiazoles and 2 - (aminotrithio) - thiazoles and various thiurams are known as accelerators in rubber vulcanization systems. Some of these accelerators must be used in rather high amounts to obtain a satisfactory vulcanization rate. The use of high amounts of expensive compounds is naturally undesirable. Other accelerators, although very potent accelerators, are undesirable because of their tendency to scorch the polymer, i.e., prevulcanize the polymer during the processing and compounding steps which precede the vulcanization step.

It is desirable that accelerator systems provide an adequate vulcanization rate, an adequate state of vulcanization and a vulcanized polymer possessing adequate physical properties, and at the same time not cause substantial prevulcanization. In addition, because of the great expense of accelerators it is desirable to achieve these results by using as small an amount as possible of accelerator system ingredients in vulcanizing the polymers. However, a substantial decrease in the level of many accelerator systems results in reduced vulcanization rates and/or a poorly vulcanized polymer possessing inferior physical properties. It is therefore desirable to use accelerator systems which can be used at low levels, but which will at the same time accelerate the vulcanization reaction at a reasonable rate to produce a vulcanized polymer possessing adequate physical properties and not cause substantial prevulcanization.

It is an object of this invention to provide an effective accelerator system and an effective vulcanization system for polymers. It is another object of this invention to provide an effective accelerator system and an effective vulcanization system which may be used at low levels. It is a further object of this invention to provide vulcanized polymers possessing adequate physical properties. It is also an object of this invention to provide a method for vulcanizing polymers.

The objects of this invention are accomplished by vulcanizing polymers in the presence of a system comprising certain 2-(aminodithio) - thiazoles and/or 2 - (amino trithio)-thiazoles and certain thiuram compounds, specifically a system comprising (a) at least one primary accelerator having the following structural formula:

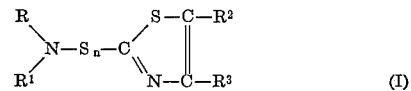

$$\begin{matrix} R \\ \diagdown \\ \diagup \\ R^1 \end{matrix} N-S_n-C \begin{matrix} \diagup \\ \diagdown \end{matrix} \begin{matrix} S-C-R^2 \\ \| \\ N-C-R^3 \end{matrix} \qquad (I)$$

wherein R and $R^1$ are selected from the group consisting of alkyl radicals having from 1 to 6 carbon atoms, cycloalkyl radicals having from 5 to 12 carbon atoms, aralkyl radicals having from 7 to 13 carbon atoms and aryl radicals having from 6 to 12 carbon atoms and R and $R^1$ can be joined through a member selected from the group consisting of —$CH_2$—, —O— and —S— to constitute with the attached nitrogen group a heterocyclic radical and wherein $R^2$ and $R^3$ are selected from the group consisting of hydrogen, alkyl radicals having from 1 to 6 carbon atoms, cycloalkyl radicals having from 5 to 12 carbon atoms, aralkyl radicals having from 7 to 13 carbon atoms and aryl radicals having from 6 to 12 carbon atoms and $R^2$ and $R^3$ can be joined together with the adjacent thiazole carbon atoms to form a hydrocarbon rings of 5 to 7 carbon atoms which possesses substituents selected from the group consisting of hydrogen, halo radicals, nitro radicals, alkyl radicals having from 1 to 4 carbon atoms and alkoxy radicals having from 1 to 4 carbon atoms and $n$ is an integer of a value from 2 to 3, and (b) at least one secondary accelerator having the following structural formula:

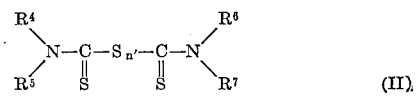

$$\begin{matrix} R^4 \\ \diagdown \\ \diagup \\ R^5 \end{matrix} N-C-S_{n'}-C-N \begin{matrix} \diagup \\ \diagdown \end{matrix} \begin{matrix} R^6 \\ \\ R^7 \end{matrix} \qquad (II)$$

wherein $R^4$ and $R^6$ are selected from the group consisting of alkyl radicals having from 1 to 4 carbon atoms, cycloalkyl radicals having from 5 to 12 carbon atoms and aralkyl radicals having from 7 to 13 carbon atoms, $R^5$ and $R^7$ are selected from the group consisting of $R^4$, $R^6$ and aryl radicals having from 6 to 12 carbon atoms and $R^4$ and $R^5$, and $R^6$ and $R^7$ can be joined through a member of the group consisting of —$CH_2$—, —O— and —S— to constiute with the attached nitrogen group a heterocyclic radical and $n'$ is an integer of a value from 1 to 4.

Since the primary accelerator portion of this accelerator system is capable of providing sulfur during the vulcanization step, the system may be used as a sulfurless vulcanization system. It can also be used in combination with free sulfur and/or a sulfur donor. When the system is used with free sulfur and/or a sulfur donor, a lesser amount of the accelerator system is necessary.

Examples of specific 2-(aminodithio) - thiazoles and 2-(aminotrithio)-thiazoles that conform to the above recited structural Formula I are represented below by a listing of specific radicals and values of $n$, any combination of which in the structural Formula I above represents a specific compound within the scope of the present invention.

| $-C\overset{S-C-R_2}{\underset{N-C-R_3}{\|}}$ | (R ——— R¹) or | (Heterocyclic rings jointly containing N, R and R¹) | n |
|---|---|---|---|
| 4-ethyl-thiazolyl | Methyl........ Methyl........ | $-N\overset{CH_2-CH_2}{\underset{CH_2-CH_2}{\diagdown}}O$ | 2 |
| 4-methyl-thiazolyl | Ethyl.......... Ethyl.......... | | 3 |
| 4,5-dimethyl-thiazolyl | Isopropyl.... Isopropyl.... | | |
| 4,5-diethyl-thiazolyl | Cyanoethyl.. Cyanoethyl.. | | |
| 4-methyl-5-carboethoxy-thiazolyl | n-Butyl...... n-Butyl...... | | |
| 4-methyl-5-carbomethoxy-thiazolyl | sec.Butyl.... sec.Butyl.... | $-N\overset{CH_2-CH_2}{\underset{CH_2-CH_2}{\diagdown}}CH_2$ | |
| 4-carboethoxy-thiazolyl | tert.Butyl... tert.Butyl... | | |
| Benzothiazolyl | Cyclohexyl.. Cyclohexyl.. | | |
| 4-ethyl-benzothiazolyl | | | |
| 4-methyl-benzothiazolyl | | $-N\overset{CH_2-CH_2}{\underset{CH_2-CH_2}{\diagdown}}CH_2$ | |
| 5-methyl-benzothiazolyl | | | |
| 5-ethyl-benzothiazolyl | | | |
| 6-methyl-benzothiazolyl | | | |
| 7-methyl-benzothiazolyl | | $-N\overset{CH_2-CH_2-CH_2}{\underset{CH_2-CH_2-CH_2}{\diagdown}}$ | |
| 4-chloro-benzothiazolyl | | | |
| 5-chloro-benzothiazolyl | | | |
| 6-chloro-benzothiazolyl | | | |
| 4-methoxy-benzothiazolyl | | | |
| 5-ethoxy-benzothiazolyl | | $-N\overset{CH_2-CH(CH_3)}{\underset{CH_2-CH(CH_3)}{\diagdown}}O$ | |
| 6-ethoxy-benzothiazolyl | | | |
| 4,5-dimethyl-benzothiazolyl | | | |
| 4,6-dimethyl-benzothiazolyl | | | |
| 4,6-dimethyl-7-chloro-benzothiazolyl | | | |
| 4,6-dimethyl-5,7-dichloro-benzothiazolyl | | $-N\overset{CH_2-CH_2}{\underset{CH_2-CH_2}{\diagdown}}S$ | |
| | | $-N\overset{CH_2-CH_2}{\underset{CH_2-CH_2}{\diagdown}}N-CH_3$ | |
| | | $-N\overset{CH_2-CH-CH_2}{\underset{CH_2-CH-CH_2}{\diagdown}}$ | |
| | | $-N\overset{CH_2-CH}{\underset{CH_2-CH}{\diagdown}}\overset{CH_2}{\underset{CH_2}{}}\overset{CH_2}{\underset{CH_2}{}}$ | |

Examples of specific thiuram compounds that conform to the above recited structural Formula II are represented below by a list of specific radicals and values of n', any combination of which in the structural Formula II above represents a specific compound within the scope of the present invention.

| Pentamethylene oxydiethylene | | Pentamethylene oxydiethylene | | |
|---|---|---|---|---|
| R⁴ | R⁵ | R⁶ | R⁷ | n' |
| Methyl..... | Methyl..... | Methyl..... | Methyl..... | 1 |
| Ethyl...... | Ethyl...... | Ethyl...... | Ethyl...... | 2 |
| Isopropyl. | Isopropyl. | Isopropyl. | Isopropyl. | 3 |
| Butyl...... | Butyl...... | Butyl...... | Butyl...... | |

Preferred primary accelerators are those according to structural Formula I wherein the $$\overset{R}{\underset{R}{\diagdown}}N-$$

radical is a morpholinyl radical, i.e., has the following structural configuration:

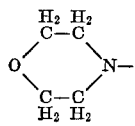

Preferably the

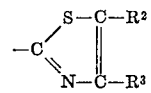

radical has the following configuration:

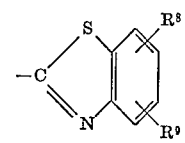

wherein R⁸ and R⁹ are selected from the group consisting of hydrogen, nitro, chloro, alkyl radicals having from 1 to 4 carbon atoms anud alkoxy radicals having from 1 to 4 carbon atoms. Also, preferably $n$ is 2. For example, R⁸ and/or R⁹ can be hydrogen, chloro, methyl or ethyl radicals.

Preferred secondary accelerators are those according to structural Formula II wherein R⁴, R⁵, R⁶ and R⁷ are alkyl radicals having from 1 to 2 carbon atoms and n' is 2.

The most preferred primary accelerators are as follows:

2-(morpholinodithio)-benzothiazole
2-(morpholinotrithio)-benzothiazole
2-(piperidinodithio)-benzothiazole
3-(N,N-dimethylaminodithio)-benzothiazole The most preferred secondary accelerators are as follows:

tetramethylthiuram monosulfide
tetramethylthiuram disulfide
tetraethylthiuram monosulfide
tetraethylthiuram disulfide The primary accelerator may be used in an amount of from about 0.30 to about 4.00 parts by weight per 100 parts by weight of polymer. A preferred range is from about 0.50 to about 3.00 parts, while a particularly preferred range is from about 0.60 to about 2.50 parts. The secondary accelerators may be used in an amount of from about 0.05 to about 0.50 part by weight per 100 parts by weight of polymer. A preferred range is from about 0.05 to about 0.35 part, while a particularly preferred range is from about 0.10 to about 0.25 part.

The amount of sulfur to be used with the accelerator system may vary from 0.00 to about 4.0 parts by weight per 100 parts by weight of polymer. A preferred range is from about 0.00 to about 3.00 parts, while a particularly preferred range is from about 0.25 to about 3.00 parts.

The 2-(aminodithio)-thiazoles and 2-(aminotrithio)-thiazoles may be prepared by various methods, including those described in U.S. Pat. Nos. 2,373,321 and 2,837,519. The thiuram compounds may be prepared by various methods including those described at pages 38–42 in Rubber Chamicals by J. Van Alphen, Elsewier Publishing Co., 1956.

The sulfur curable polymers that may be vulcanized within the practice of the present invention include sulfur-curable diene rubbers, such as natural rubber, chemically treated natural rubber, balata and synthetic rubbers prepared from monomer systems containing conjugated and nonconjugated dienes. Examples of such synthetic polymers are polychloroprene; homopolymers of a conjugated 1,3-diene such as isoprene and butadiene, and in particular, polyisoprenes and polybutadienes having at least 30 percent of their repeat units combined in a cis-1,4 structure; copolymers of a conjugated 1,3-diene such as isoprene and butadiene with up to 50 percent by weight of at least one copolymerizable monomer such as styrene and acrylonitrile; butyl rubber, which is a polymerization product of a major proportion of a monoolefin and a minor proportion of a multiolefin such as butadiene or isoprene; polyurethanes containing carbon to carbon double bonds; and copolymers of monooelfins containing unsaturation, i.e., carbon to carbon double bonds, such as terpolymers of ethylene, propylene and a nonconjugated diene.

The accelerators may be added to the polymers by any of the conventional means, e.g., by milling on an open mill or by internal mixing in a Banbury type apparatus. The method of addition is not normally critical to the operation of the present invention.

As is normally the case with conventional vulcanization systems, the curatives should preferably be compounded with the polymers at temperatures low enough to prevent prevulcanization. For example, a standard method involves Banburying the compounds such as carbon black, processing oils, etc., into the polymer and then subsequently milling or Banburying the curatives into the polymer at a lower temperature. It is preferred that the compounds be in finely divided form for ease of incorporation and optimum vulcanization effect. If desired, rather than being added to the dry polymer, they may be added as solutions, suspensions, dispersions or emulsions to solutions, suspensions, dispersions or emulsions of the polymer. They may be added individually or in combination and in any order.

Obviously the curing systems of this invention may be used in curing rubbers compounded with any of the customarily used rubber compounding ingredients in proportions well known in the art. For example, the rubber composition may contain any of the well known fillers as carbon blacks, metallic oxides, etc.; softeners such as the various oils, asphalts and tars, etc.; lubricants such as fatty acids, soaps, viscous oils, etc.; and antioxidants such as one or more of the known amine antioxidants or one or more of the phenolic antioxidants, etc., and any of the other customary compounding ingredients used in the art.

Also, the curing systems of this invention may be used in connection with the curing of any of the known sulfur-curable rubbers using the known curing conditions of time, temperature and pressure. For example, rubber compositions containing the curing systems of this invention may be cured during the customary cycles which may range from 12 minutes to 10 hours, from 200° F. to 330° F. and from 25 to 1000 pounds per square inch pressure. Obviously thin rubber sheets would require lower times, temperatures and pressures than would the curing of giant earth mover tires.

The following examples include illustrations of the practice of the present invention and are not intended to be interpreted as limitations of the present invention. Unless stated otherwise herein the parts expressed in the following examples are parts by weight.

EXAMPLE 1

SBR 1710 was compounded in a Banbury to form a nonproductive stock (Stock B, Table I). The stock was divided into two portions which were compounded in a Banbury as described in Table II to form productive Stocks B¹ and B². Stock B¹ contained an accelerator system outside the scope of the present invention, the system consisting of benzothiazyl disulfide and diphenyl guanidine. Stock B² contained an accelerator system within the scope of the present invention. The latter system consisted of 2-(morpholinodithio)-benzothiazole and tetramethylthiuram disulfide. Tests were run on portions of Stocks B¹ and B² which had been vulcanized for 18 minutes at 300° F. The test results are listed in Tables III and IV.

TABLE I

| Components: | Stock B (parts) |
|---|---|
| SBR 1710 [1] | 137.50 |
| ISAF black | 68.00 |
| Stearic acid | 2.00 |
| Blend of microcrystalline and paraffin waxes (Atlantic Wax 1115) | 3.80 |
| Amine antioxidant (Wing-Stay 100) | 1.15 |
| Total | 212.45 |

[1] An oil extended SBR containing about 37.5 parts of an aromatic extending oil and having a bound styrene content of about 23.5 weight percent.

TABLE II

| | Stock B¹, Parts | Stock B², Parts |
|---|---|---|
| Components: | | |
| Stock B | 212.45 | 212.45 |
| Zinc oxide | 3.00 | 3.00 |
| Sulfur | 1.50 | 1.50 |
| Benzothiazyl disulfide | .90 | |
| Diphenyl guanidine | .55 | |
| 2-(morpholinodithio)-benzothiazole | | .55 |
| Tetramethylthiuram disulfide | | 2.0 |
| Total | 218.40 | 217.70 |

TABLE III

| | Stock B¹ | Stock B² |
|---|---|---|
| Physical properties: | | |
| 300% modulus, p.s.i.[a] | 925 | 1,050 |
| Tensile, p.s.i.[a] | 3,025 | 3,200 |
| Percent elongation [a] | 705 | 690 |
| Tensile, p.s.i. (after 16 hours air bomb aging)[a,d] | 2,550 | 2,500 |
| Elongation (after 16 hours air bomb aging)[c,d] | 470 | 480 |
| Percent hot rebound, 212° F.[b] | 64.7 | 66.7 |
| Hot tensile, p.s.i. (212° F.)[c] | 1,685 | 1,895 |

[a] Albertoni, George J., Analytical Edition of Industrial and Engineering Chemistry 3 July 15, 236 (1931).
[b] ASTM-D1054.
[c] ASTM-D412-62T—Part J.
[d] ASTM-D454-53 (80 p.s.i. at 236° F.).

As the data in Table III indicate, an accelerator system of the present invention (Stock B²) afforded equal to superior physical properties when compared with an accelerator system (Stock B¹) outside the scope of the present invention, even though only 0.75 part of the former system was used as compared to 1.45 parts of the latter system. The tensile, hot rebound and hot tensile of Stock B² were superior to those of Stock B¹.

Passenger tires were built with treads containing Stocks B¹ and B². The tires were road tested on a fast wear circuit and a slow wear circuit. The former circuit has a smaller radius and therefore resulted in more cornering and a faster rate of wear. Both runs were made at 70 miles per hour. The depth of the two centerline grooves of the tread was measured at at least ten different points before testing and after 8000 miles of fast wear and 16,000 miles of slow wear. The depth differences were then averaged. The treadwear rating for Stock B¹ was arbitrarily set at 100. The treadwear rating for Stock B² was determined by dividing the average depth difference of Stock B¹ by the average depth difference of Stock B² and multiplying by 100. The results are listed in Table IV.

TABLE IV

|  | Stock B¹ | Stock B² |
|---|---|---|
| Road test results, passenger tires: |  |  |
| Fast rate of wear, 8,000 miles | 100 | 102 |
| Slow rate of wear, 16,000 miles | 100 | 105 |

As the above data indicate, an accelerator system of the present invention (Stock B²) provided equivalent to superior treadwear resistance even though only 0.75 part of the accelerator system was used as compared to 1.45 parts of a system outside the scope of the present invention (Stock B¹).

EXAMPLE 2

In this example an accelerator system of the present invention was used in vulcanizing a natural rubber/SBR 1710 blend. The natural rubber was compounded to form a nonproductive stock (Stock C, Table V). The stock was divided into two portions which were compounded as described in Table VI to form productive stocks C¹ and C². Stock C¹ contained an accelerator system outside the scope of the present invention while Stock C² contained an accelerator system within the scope of the present invention. Tests were run on portions of Stocks C¹ and C² which had been vulcanized for 8 minutes at 310° F. The test results are listed in Tables VII and VIII. The samples were subjected to the same tests recited in Example 1, with the exception of treadwear tests. In addition, hot static adhesion tests involving both nylon and rayon were run along with an axle resiliometer test.

The hot static adhesion tests between the rayon or nylon cord and the vulcanized rubber were run in the following manner. Both ends of a ¼ inch cord were embedded in a stock vulcanized for 8 minutes at 310° F. to form a U-shaped cord loop. The cord and vulcanized stock were heated to 250° F. an increasing force was exerted on the looped portion of the cord in an effort to remove either or both ends of the cord from the vulcanized stock. The force necessary to remove the cord was taken as a measure of the adhesion between the cord and the vulcanized stock.

The axle resiliometer tests were run in the following manner to test carcass durability. A tire containing the vulcanized stock in the sidewall portion of the tire was inflated to a pressure of 24 pounds per square inch (p.s.i.). It was then placed in contact with a 4 inch shaft rotating at 7 miles per hour. The load exerted by the tire against the rotating shaft was 20% in excess of the Tire and Rim Association standards. The mileage to failure as evidenced by ply separation was taken as a measure of the carcass durability.

TABLE V

| Components: | Stock C (parts) |
|---|---|
| Natural rubber | 70.00 |
| SBR 1710 | 41.25 |
| Rosin acid softener | 10.00 |
| Amine antioxidant | 1.00 |
| SRF black | 50.00 |
| Total | 172.25 |

TABLE VI

|  | Stock C¹, parts | Stock C², parts |
|---|---|---|
| Components: |  |  |
| Stock C | 172.25 | 172.35 |
| Zinc oxide | 5.00 | 5.00 |
| Sulfur | 2.25 | 2.25 |
| Benzothiazyl disulfide | 1.20 |  |
| 2-(Morpholinodithio)-benzothiazole |  | .80 |
| Diphenyl guanidine | .30 |  |
| Tetramethylthiuram disulfide |  | .10 |
| Total | 181.00 | 180.40 |

TABLE VII

| Physical Properties | Stock C¹ | Stock C² |
|---|---|---|
| 300% modulus, p.s.i.[a] | 775 | 875 |
| Tensile, p.s.i.[a] | 2,125 | 2,100 |
| Percent elongation [a] | 640 | 580 |
| Tensile, p.s.i. (after 14 hours air bomb aging) [a,d] | 1,075 | 1,125 |
| Percent elongation, after 14 hours air bomb aging [a,d] | 255 | 285 |
| Percent hot reb, 212° F.[b] | 81.8 | 84.2 |
| Hot tensile, p.s.i. (212° F.) [c] | 1,080 | 1,105 |
| Hot static adhesion, lbs. (Rayon fabric) | 14.6 | 20.8 |
| Hot static adhesion, lbs. (Nylon fabric) | 9.6 | 13.0 |

[a] George J. Albertoni, Analytical Edition of Industrial and Engineering Chemistry 3 July 15, 236 (1931).
[b] ASTM-D1054.
[c] ASTM-D412-62T—Part J.
[d] ASTM-D454-53 (80 p.s.i. at 236° F.).

TABLE VIII.—SEPARATION RESISTANCE

Axle resiliometer (miles to failure):
  Stock C¹ _____ 413
  Stock C² _____ 689

As shown in Tables VII and VIII, the stock (Stock C²) containing an accelerator system within the scope of the present invention possessed superior percent hot rebound, superior hot static adhesion with both rayon and nylon, and superior separation resistance when compared with a stock (Stock C¹) containing an accelerator system outside the scope of the present invention even though 1.50 parts of the latter system were used, while only 0.90 part of the former system was used.

EXAMPLE 3

Nonproductive Stock B under Example 1 was compounded as described in Table IX to provide two productive stocks, Stock D¹ and Stock D². The former stock contained an accelerator system outside the scope of the present invention while the latter stock contained an accelerator system containing still another primary accelerator within the scope of the present invention. The stocks were vulcanized for 18 minutes at 300° F. Modulus, tensile, elongation and hot rebound data were gathered as described in Example 1. Goodrich Flex data were also obtained.

The tests results are listed in Table X.

TABLE IX

|  | Stock D¹, parts | Stock D², parts |
|---|---|---|
| Components: |  |  |
| Stock D | 212.45 | 212.45 |
| Zinc oxide | 3.00 | 3.00 |
| Sulfur | 1.50 | 1.50 |
| Benzothiazyl disulfide | .90 |  |
| Diphenyl guanidine | .55 |  |
| 2-(morpholinotrithio)-benzothiazole |  | .60 |
| Tetramethylthiuram disulfide |  | .20 |
| Total | 218.40 | 217.75 |

TABLE X

|  | Stock D[1] | Stock D[2] |
|---|---|---|
| Physical properties, 18 minutes at 300° F.: |  |  |
| 300% modulus, p.s.i.[a] | 900 | 925 |
| Tensile, p.s.i.[a] | 2,900 | 2,875 |
| Percent elongation [a] | 690 | 695 |
| Percent hot rebound, 212° F.[b] | 63.6 | 63.6 |
| Percent set, Goodrich flex [c] | 3.4 | 3.6 |

[a] George J. Albertoni, Analytical Edition of Industrial and Engineering Chemistry 3 July 15, 236 (1931).
[b] ASTM-D1054.
[c] ASTM D-623 method A.

As shown by the above data the accelerator system of the present invention (Stock D[2]) provided vulcanized polymer properties equal to those of a polymer vulcanized using an accelerator system outside the scope of the present invention (Stock D[1]), even though the latter was present in an amount of 1.45 parts and the former was present in an amount of only 0.80 part.

EXAMPLE 4

SBR 1710 was compounded as described in Table I to form a nonproductive stock (Stock E). Stock E was divided into four portions and compoundsd as described in Table II to provide four productive stocks (E[1], E[2], E[3] and E[4]). These stocks were vulcanized for 40 minutes at 275° F. Tensile and hot rebound data were obtained on the vulcanized stocks. Tuber scorch data were gathered on the unvulcanized productive stock.

The tuber scorch test to determine scorch, i.e., prevulcanization resistance, was run in the following manner. One hundred and eighty cubic centimeters of compounded stock were fed into a 1½ inch tuber at 60 revolutions per minute. The tuber die was oval shaped and 1¾ inches in length. Its interior diameter was 7/64 inch at its center, tapering to 1/16 inch at its ends. The tubing temperature was 270° F. The stock was continuously recycled by hand back into the tuber until scorching began. Scorch was determined by a hand analysis of the stock, including its texture and color. The time to scorch was taken as a measure of scorch resistance, the longer the time to scorch being indicative of increased scorch resistance.

Stock E[1] contained an accelerator system outside the scope of the present invention. Stocks E[2], E[3] and E[4] contained an accelerator system within the scope of the present invention, used in varying amounts with various amounts of sulfur.

TABLE XI

| Components: | Stock E (parts) |
|---|---|
| SBR 1710 | 137.50 |
| Pentachlorothiophenol | .35 |
| Stearic acid | 2.00 |
| Blend of microcrystalline and paraffin waxes (Atlantic Wax 1115) | 3.00 |
| Amine antioxidant | 2.00 |
| Processing oil | 10.00 |
| HAF black | 75.00 |
| Total | 229.85 |

TABLE XII

|  | Stock E[1], parts | Stock E[2], parts | Stock E[3], parts | Stock E[4], parts |
|---|---|---|---|---|
| Stock E | 229.85 | 229.85 | 229.85 | 229.85 |
| Zinc oxide | 3.00 | 3.00 | 3.00 | 3.00 |
| Sulfur | 2.00 | 1.50 | .75 |  |
| Benzothiazyl disulfide | .75 |  |  |  |
| Diphenyl guanidine | .60 |  |  |  |
| 2-(morpholinodithio)-benzothiazole |  | 1.00 | 2.00 | 3.00 |
| Tetramethylthiuram monosulfide |  | .25 | .25 | .25 |
| Total | 236.20 | 235.60 | 235.85 | 236.10 |

TABLE XIII

| Physical Properties | Stock E[1] | Stock E[2] | Stock E[3] | Stock E[4] |
|---|---|---|---|---|
| 300% modulus, p.s.i.[a] | 1,000 | 1,275 | 1,120 | 1,550 |
| Tensile, p.s.i.[a] | 2,700 | 2,900 | 2,660 | 3,000 |
| Percent elongation [a] | 645 | 575 | 580 | 525 |
| Tuber scorch, 260° F | 19¾ | 20+ | 20+ | 20+ |
| Percent hot rebound, 212° F.[b] | 67.3 | 70.7 | 70.7 | 74.1 |

[a] George J. Albertoni, Analytical Edition of Industrial and Engineering Chemistry 3 July 15, 236 (1931).
[b] ASTM-D1054.

As shown by the above data, similar optimum physical properties can be obtained using various levels of the accelerator system of the present invention provided the sulfur level is varied accordingly (Stocks E[2], E[3] and E[4]). The data also reveal that a variety of secondary accelerators (e.g., tetramethylthiuram monosulfide) may be used effectively in the practice of the present invention. In addition, the performance of Stock E[4] demonstrates the effectiveness of a sulfurless system using an accelerator system of the present invention. That is, it illustrates that the system of the present invention may be used as a vulcanization system devoid of free sulfur.

EXAMPLE 5

Natural rubber (smoked sheet) was compounded to form a nonproductive stock (Stock F) by Banburying the components described in Table XIV.

TABLE XIV

| Components: | Stock F (parts) |
|---|---|
| Natural rubber (smoked sheet) | 100.0 |
| HAF black | 50.0 |
| Asphaltic processing oil | 3.00 |
| Phenylbetanaphthylamine | 0.35 |
| Phenylalphanaphthylamine | 1.00 |
| Nonproductive | 154.35 |

The above stock was divided into five portions which were compounded in a Banbury as described in Table XV to form productive stocks F[1], F[2], F[3], F[4] and F[5]. Stock F[1] contained an acceleration system within the scope of the present invention while Stocks F[2], F[3], F[4] and F[5] contained acceleration systems outside the scope of the present invention.

TABLE XV

| Components | Stocks, parts | | | | |
|---|---|---|---|---|---|
|  | F[1] | F[2] | F[3] | F[4] | F[5] |
| Stock F | 154.35 | 154.35 | 154.35 | 154.35 | 154.35 |
| Zinc oxide | 3.00 | 3.00 | 3.00 | 3.00 | 3.00 |
| Stearic acid | 3.00 | 3.00 | 3.00 | 3.00 | 3.00 |
| Sulfur | 1.00 | 1.00 | 1.00 | 1.00 | 1.00 |
| 2-(morpholinodithio)-benzothiazole | 0.55 | 0.55 |  | 0.80 |  |
| Tetramethylthiuram disulfide | 0.25 |  | 0.25 |  | 0.80 |
| Productive | 162.15 | 161.90 | 161.60 | 162.15 | 162.15 |

Modulus, tensile and elongation measurements were made along with some air bomb aged modulus, tensile and elongation measurements on portions of Stocks F[1], F[2], F[3], F[4] and F[5] which had been vulcanized for 20, 35, 70 and 140 minutes at 275° F. Mooney scorch measurements were made on the unvulcanized stocks. The results are listed in Table XVI.

TABLE XVI

| | Stocks | | | | |
|---|---|---|---|---|---|
| | F 1 | F 2 | F 3 | F 4 | F 5 |
| 300% modulus, p.s.i. a: | | | | | |
| 20/275 | 1,850 | 1,200 | 1,250 | 1,475 | 1,950 |
| 35/275 | 2,075 | 1,450 | 1,275 | 1,775 | 2,100 |
| 70/275 | 2,200 | 1,685 | 1,360 | 1,875 | 2,100 |
| 140/275 | 2,300 | 1,700 | 1,225 | 1,950 | 2,275 |
| Tensile, p.s.i. a: | | | | | |
| 20/275 | 4,300 | 3,575 | 3,675 | 4,250 | 4,075 |
| 35/275 | 4,200 | 3,850 | 3,400 | 4,375 | 4,325 |
| 70/275 | 4,400 | 3,950 | 3,200 | 4,150 | 4,100 |
| 140/275 | 4,050 | 4,050 | 2,950 | 4,300 | 4,025 |
| Percent elongation a: | | | | | |
| 20/275 | 560 | 620 | 610 | 630 | 530 |
| 35/275 | 525 | 600 | 580 | 600 | 545 |
| 70/275 | 520 | 570 | 540 | 545 | 510 |
| 140/275 | 475 | 570 | 525 | 560 | 480 |
| 300% modulus, p.s.i. (after 16 hours air bomb aging) a b: | | | | | |
| 70/275 | 1,750 | 1,125 | 640 | 1,450 | 1,450 |
| 140/275 | 1,700 | 1,075 | 600 | 1,500 | 1,450 |
| Tensile, p.s.i. (after 16 hours air bomb aging) a b: | | | | | |
| 70/275 | 2,825 | 1,750 | 1,000 | 2,750 | 2,250 |
| 140/275 | 2,400 | 1,550 | 850 | 2,500 | 1,975 |
| Percent elongation, after 16 hours air bomb aging a b: | | | | | |
| 70/275 | 450 | 420 | 410 | 500 | 420 |
| 140/275 | 400 | 400 | 385 | 470 | 380 |
| Mooney scorch, 20 point rise c | 13.25 | 31.5 | 11.5 | 32.5 | 7.5 | a George J. Albertoni, Analytical Edition of Industrial and Engineering Chemistry 3 July 15, 236 (1931).
b ASTM-D454-53 (80 p.s.i. at 236° F.).
c ASTM D 1646.

As indicated by the above data, the individual components which make up the combination of the present invention are inferior to the combination of the present invention. Where the primary accelerator was used alone, (F² and F⁴) poor vulcanization rates resulted, as indicated by the modulus data. Where the secondary accelerator was used alone at a low level (F³) the vulcanization rate was poor. When larger amounts of the secondary accelerator were used (F⁵) severe scorching occured.

All of the stocks described in the examples herein, which contained systems of the present invention, possessed good scorch resistance.

In the preceding examples large amounts of accelerator systems outside the scope of the present invention were necessary to obtain reasonable physical properties. Had these accelerator systems been used at the same levels as the system of the presention, the vulcanized polymers would have possessed, on the whole, inferior physical properties and reduced vulcanization rates.

All of the accelerator systems of the present invention described earlier herein will perform effectively, as did those described in Examples 2 through 5. Since lower than normal amounts of these accelerator systems can be used to provide vulcanized polymers possessing satisfactory properties, an economic advantage is obtained.

As previously stated and illustrated herein, the accelerator system of the present invention can be used as a sulfurless vulcanization system. When so used it has less tendency to scorch than many other sulfurless systems such as a system consisting solely of tetramethylthiuram disulfide. It also provides vulcanized polymers possessing properties superior to those of polymers vulcanized with many other sulfurless systems.

High temperature heat aging often results in a porous polymer which becomes embrittled or gummy based on the nature of the particular polymer. The accelerator system of the present invention provides the vulcanized polymer with better high temperature heat aged resistance, particularly at levels of sulfur from about 1.0 to about 2.5 parts of sulfur by weight per 100 parts of polymer. The system also provides the vulcanized polymer with better adhesion properties, especially at elevated temperatures, than many other accelerator systems.

The system of the present invention is particularly superior to many other accelerator systems of the prior art at low levels of sulfur, for example, levels less than 0.50 part by weight per 100 parts of polymer, and particularly at levels less than 0.25 part sulfur by weight per 100 parts by weight of polymer in that it provides good scorch resistance to the unvulcanized polymer and provides a vulcanized polymer with good high temperature heat aged resistance.

While certain representative embodiments and details have been shown for the purpose of illustrating the invention it will be apparent to those skilled in this art that various changes and modifications may be made therein without departing from the spirit or scope of the invention.

I claim:
1. A composition comprising (a) at least one thiazole having the following structural formula:

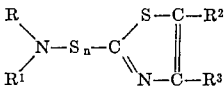

wherein R and R¹ are joined through a member selected from the group consisting of —CH₂—, —O— and —S— to constitute with the attached nitrogen group a heterocyclic radical and wherein R² and R³ are selected from the group consisting of hydrogen, alkyl radicals having from 1 to 6 carbon atoms, cycloalkyl radicals having from 5 to 12 carbon atoms, aralkyl radicals having from 7 to 13 carbon atoms and aryl radicals having from 6 to 12 carbon atoms and R² and R³ can be joined together with the adjacent thiazole carbon atoms to form a hydrocarbon ring of 5 to 7 carbon atoms which possesses substituents selected from the group consisting of hydrogen, chloro radicals, nitro radicals, alkyl radicals having from 1 to 4 carbon atoms and alkoxy radicals having from 1 to 4 carbon atoms and $n$ is an integer of a value from 2 to 3, and (b) at least one thiuram having the following structural formula:

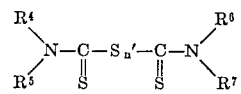

wherein R⁴ and R⁶ are selected from the group consisting of alkyl radicals having from 1 to 4 carbon atoms, cycloalkyl radicals having from 5 to 12 carbon atoms and aralkyl radicals having from 7 to 13 carbon atoms, R⁵ and R⁷ are selected from the group consisting of R⁴, R⁶ and aryl radicals having from 6 to 12 carbon atoms and $n'$ is an integer of a value from 1 to 4 wherein the weight ratio of (a) to (b) is from about 4.00/0.05 to about 0.30/0.50 and (c) sulfur.

2. The composition according to claim 1 wherein (a) is 2-(morpholinodithio)-benzothiazole and (b) is selected from the group consisting of tetramethylthiuram disulfide and tetraethylthiuram disulfide.

3. A sulfur vulcanizable diene rubber containing a composition comprising (a) at least one thiazole having the following structural formula:

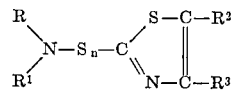

wherein R and R¹ are joined through a member selected from the group consisting of —CH₂—, —O— and —S— to constitute with the attached nitrogen group of heterocyclic radical and wherein R² and R³ are selected from the group consisting of hydrogen, alkyl radicals having from 1 to 6 carbon atoms, cycloalkyl radicals having from 5 to 12 carbon atoms, aralkyl radicals having from 7 to 13 carbon atoms and aryl radicals having from 6 to 12 carbon atoms and R² and R³ can be joined together with the adjacent thiazole carbon atoms to form a hydrocarbon ring of 5 to 7 carbon atoms which possesses substituents selected from the group consisting of hydrogen, chloro radicals, nitro radicals, alkyl radicals having from 1 to 4 carbon atoms and alkoxy radicals having from 1 to 4 carbon atoms and $n$ is an integer of a value from 2 to 3, and (b) at least one thiuram having the following structural formula:

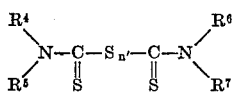

wherein $R^4$ and $R^6$ are selected from the group consisting of alkyl radicals having from 1 to 4 carbon atoms, cycloalkyl radicals having from 5 to 12 carbon atoms and aralkyl radicals having from 7 to 13 carbon atoms, $R^5$ and $R^7$ are selected from the group consisting of $R^4$, $R^6$ and aryl radicals having from 6 to 12 carbon atoms and $n'$ is an integer of a value from 1 to 4 wherein (a) is present in the amount of from about 0.30 to about 4.0 parts and (b) is present in the amount of from about 0.05 to about 0.50 part, wherein all parts are by weight per 100 parts by weight of the sulfur vulcanizable diene rubber and (c) sulfur.

4. The sulfur vulcanizable diene rubber according to claim 3 wherein (a) is present in the amount of from about 0.50 to about 3.00 parts, (b) is present in the amount of from about 0.05 to about 0.35 part and (c) is present in the amount of from 0.25 to about 3.00 parts.

5. The sulfur vulcanizable diene rubber according to claim 3 wherein (a) is present in the amount of from about 0.60 to about 2.50 parts, (b) is present in the amount of from about 0.10 to about 0.25 part and (c) is present in the amount of from about 0.25 to about 3.00 parts.

6. The sulfur vulcanizable diene rubber according to claim 3 wherein the

radical is a morpholinyl radical, the

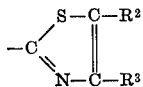

radical has the following structure:

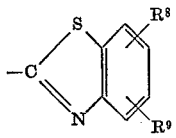

wherein $R^8$ and $R^9$ are selected from the group consisting of hydrogen, nitro, chloro, alkyl radicals having from 1 to 4 carbon atoms and alkoxy radicals having from 1 to 4 carbon atoms, $n$ is 2, $R^4$, $R^5$, $R^6$ and $R^7$ are alkyl radicals having from 1 to 2 carbon atoms and $n'$ is 2.

7. The sulfur vulcanizable diene rubber according to claim 3 wherein (a) is 2-(morpholinodithio)-benzothiazole and (b) is a compound selected from the group consisting of tetramethylthiuram disulfide and tetraethylthiuram disulfide.

8. The sulfur vulcanizable diene rubber according to claim 5 wherein the

radical is a morpholinyl radical, the

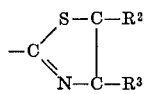

radical has the following structure:

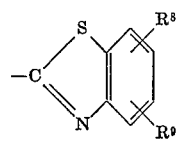

wherein $R^8$ and $R^9$ are selected from the group consisting of hydrogen, nitro, chloro, alkyl radicals having from 1 to 4 carbon atoms and alkoxy radicals having from 1 to 4 carbon atoms, $n$ is 2, $R^4$, $R^5$, $R^6$ and $R^7$ are alkyl radicals having from 1 to 2 carbon atoms and $n'$ is 2.

9. The sulfur vulcanizable diene rubber according to claim 5 wherein (a) is 2-(morpholinodithio)-benzothiazole and (b) is a compound selected from the group consisting of tetramethylthiuram disulfide and tetraethylthiuram disulfide.

10. A method of vulcanizing a sulfur vulcanizable diene rubber by heating said rubber containing a composition according to claim 3.

References Cited

UNITED STATES PATENTS

| | | | |
|---|---|---|---|
| 2,273,322 | 2/1942 | Jones | 260—775 |
| 2,284,578 | 5/1942 | Jones | 260—788 |
| 2,968,640 | 1/1961 | Gregg, Jr. | 260—41.5 |
| 3,150,130 | 9/1964 | Hardman | 260—247.1 |
| 3,491,069 | 1/1970 | Brooks | 260—79.5 |

JOSEPH L. SCHOFER, Primary Examiner

C. A. HENDERSON, Jr., Assistant Examiner

U.S. Cl. X.R.

152—330; 260—784, 785, 793

PO-1050
(5/69)

UNITED STATES PATENT OFFICE
CERTIFICATE OF CORRECTION

Patent No. 3,558,739          Dated January 26, 1971

Inventor(s) Herbert N. Kagarise

It is certified that error appears in the above-identified patent and that said Letters Patent are hereby corrected as shown below:

```
Column  2, line 31, "rings" should be --ring--.
Column  4, line 64, "anud" should be --and--.
Column  5, line 28, "Chamicals" should read --Chemicals--
Column  6, Table III, under heading Stock B², "3200"
                      should read --3250--.
Column  9, Table X, "300⁶F." should be --300°F.--;
                    "212⁶F." should be --212°F.--.
Column  9, line 22, "Table I" should be --Table XI--;
Column  9, line 25, "Table II" should be --Table XII--.
Column 11, line 44, "presention" should be --present
                      invention--.
Column 11, line 49, "2" should be --1--.
Column 12, line 63, "of" should be --a--.
```

Signed and sealed this 14th day of September 1971.

(SEAL)
Attest:

EDWARD M. FLETCHER, JR.          ROBERT GOTTSCHALK
Attesting Officer          Acting Commissioner of Pa